United States Patent
Lin et al.

(10) Patent No.: US 6,765,081 B2
(45) Date of Patent: Jul. 20, 2004

(54) THERMAL RESPONSIVE, WATER-SOLUBLE POLYMERS

(75) Inventors: Chih-Hsiang Lin, Taipei (TW); In-Mau Chen, Hsinchu (TW); Wen-Ling Lui, Ilan (TW)

(73) Assignee: Industrial Technology Research Institute, Hsinchu (TW)

( * ) Notice: Subject to any disclaimer, the term of this patent is extended or adjusted under 35 U.S.C. 154(b) by 26 days.

(21) Appl. No.: 10/136,348

(22) Filed: May 2, 2002

(65) Prior Publication Data

US 2003/0120028 A1 Jun. 26, 2003

(30) Foreign Application Priority Data

Dec. 19, 2001 (TW) .......................................... 90131492 A

(51) Int. Cl.$^7$ .......................... C08G 69/16; C08G 69/24
(52) U.S. Cl. .................... 528/310; 528/322; 528/323; 525/283; 525/326.9; 525/329.9; 525/328.2
(58) Field of Search ................................. 528/310, 322, 528/323; 525/283, 328.2, 326.9, 329.9, 328

(56) References Cited

U.S. PATENT DOCUMENTS 5,969,052 A * 10/1999 Mumick et al. ......... 525/329.9

* cited by examiner

Primary Examiner—P. Hampton Hightower
(74) Attorney, Agent, or Firm—Sughrue Mion, PLLC

(57) ABSTRACT

A thermal responsive, water soluble polymer. The polymer comprises the co-polymerization product of: (a) 5~95 wt % of N-isopropyl acrylamide (NIP); (b) 0.1~80 wt % of 1-vinyl-2-pyrrolidinone (VPD); and optionally, (c) 0.1~30 wt % of acrylic acid (AA). As the proportion of component (b) VPD increases, the Lower Critical Solution Temperature (LCST) and water solubility of the polymer increases. On the other hand, as the proportion of component (c) AA increases, the Lower Critical Solution Temperature (LCST) decreases and the COOH reactive groups increases, which impart high reactivity to the copolymer. By adjusting the proportion of the monomers, a broad range of LCST can be manipulated from about 20 to 80° C.

12 Claims, No Drawings

THERMAL RESPONSIVE, WATER-SOLUBLE POLYMERS

FIELD OF THE INVENTION

The present invention relates to polymer materials, and more particularly to thermal responsive, water-soluble polymers

BACKGROUND OF THE INVENTION

Many polymer solutions exhibit a cloud point phenomenon, which occurs at the cloud point temperature, above or below which the polymer is soluble and the solution is clear, but below or above which it becomes insoluble and precipitates and solutions become opaque. In most polymer-solvent systems, solubility decreases with falling temperature, but in some cases involving polar polymers, the opposite occurs and the polymer suddenly precipitates at a specific, higher temperature, the cloud-point temperature, or lower critical solution temperature (LCST). If such clear to opaque transitions occur at a low enough temperature and are reversible, such polymer solutions or gels are useful in a variety of applications such as temperature dependent drug release systems or to isolate or purify specific compounds. Polymers which are thermally reversible and water soluble are among the so-called smart polymers.

It is a developing technique to apply water soluble smart polymers in chemical isolation and purification. The water soluble smart polymers are expected to be a key material in the fields of bio-medicine, environment, and resources. However, some problems encountered in conventional water soluble smart polymer application.

First, the reactive groups of conventional water soluble smart polymers are bonded only at two ends of the main chain polymers. The number of the reactive groups is insufficient for chemical purification, or isolation, which limits the scale of such processes. (Bioconjugate Chem., 4, 341–346 (1993))

Second, the gap between the LCST of thermal responsive, water soluble polymers and human body temperature goes beyond 3° C., such as the polymers disclosed in U.S. Pat. No. 5,969,052 by Mumick, et al. The LCST of conventional thermal responsive, water soluble polymers are below 34° C. and the operation range is narrow. Therefore, there is a difficulty to apply smart polymers to drug release in humans.

There is a need to provide a better thermal responsive, water soluble polymer to avoid the disadvantages above and to achieve wider application of smart polymers.

SUMMARY OF THE INVENTION

One object of the present invention is to provide a thermal responsive, water soluble polymer with a broad and adjustable range of cloud point.

Another object of the present invention is to provide a thermal responsive, water soluble polymer with a greater number of reactive functional groups to increase the chemical purification or isolation efficiency.

Still another object of the present invention is to provide a thermal responsive, water soluble polymer with a cloud point close to human body temperature (about 37° C.) for temperature dependent drug release system application.

To achieve the above-mentioned objects, a thermal responsive, water soluble polymer according to the present invention comprises the co-polymerization product of: (a) 5~95 wt % of N-isopropyl acrylamide (NIP); (b) 0.1~80 wt % of 1-vinyl-2-pyrrolidinone (VPD); and optionally, (c) 0.1~30 wt % of acrylic acid (AA). The precipitation temperature of the polymer is adjustable by varying the proportion of the monomers above. As the proportion of component (b) VPD increases, the Lower Critical Solution Temperature (LCST) and the water solubility of the polymer increase. On the other hand, as the proportion of component (c) AA increases, the Lower Critical Solution Temperature (LCST) decreases and the COOH reactive groups increases, which impart high reactivity to the copolymer. By adjusting the proportion of the monomers, a broad range of the LCST can be manipulated and a larger number of reactive groups on the polymer is achieved.

DETAILED DESCRIPTION OF THE INVENTION

The present invention will become more fully understood from the detailed description given herein below, given by way of illustration only and thus not intended to be limitative of the present invention.

A thermal responsive, water soluble polymer according to the present invention is copolymerized by N-isopropyl acrylamide (NIP), 1-vinyl-2-pyrrolidinone (VPD) and optionally, acrylic acid (AA). The reaction formula is as follow:

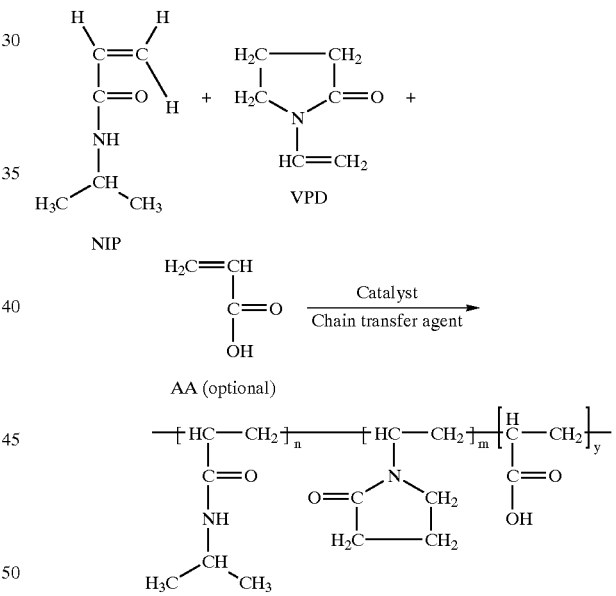

The cloud point or LCST of the thermal responsive, water soluble polymer is elevated with 1-vinyl-2-pyrrolidinone (VPD) present. The LCST of the thermal responsive, water soluble polymer is elevated up to 80° C. by increasing the proportion of 1-vinyl-2-pyrrolidinone (VPD). Moreover, the water solubility of the thermal responsive, water soluble polymer is also increased by adding 1-vinyl-2-pyrrolidinone (VPD) as a reactive monomer because of its superior hydrophilic property. Furthermore, the third monomer, acrylic acid (AA), is added optionally to lower the LCST of the thermal responsive, water soluble polymer. The LCST of the thermal responsive, water soluble polymer can be lowered to 20° C. by increasing the proportion of acrylic acid (AA) in the polymer. In the event, the LCST of the thermal responsive, water soluble polymer is adjusted from 20 to 80°

C. by varying the proportion of the monomers NIP, VPD and AA, which provides a wilder range of LCST than conventional polymers.

Compared with the physical property, the solubility of sole NIP polymers is 40~50% (polymer/polymer+water), and the solubility of NIP-VPD copolymers is elevated up to 50~60%.

The third monomer, acrylic acid (AA), according to the present invention is not only to lower the LCST of the polymer, but also to increase the number of reactive groups on the polymer chain because of the COOH reactive group.

The polymer according to the present invention can be applied on release-control of bio-engineering, chemical isolation and purification, or biosensor. In one preferred embodiment of the present invention, the monomers of (a) N-isopropyl acrylamide (NIP) and (b) 1-vinyl-2-pyrrolidinone (VPD) are copolymerized to synthesize a thermal responsive, water soluble polymer with the LCST between 36.5~38.5° C. which is close to human body temperature. The preferred molar ratio of (a) and (b) is about 8~10:1. In another preferred embodiment, a monomer (c), acrylic acid (AA), is added in (a) and (b) to copolymerize a thermal responsive, water soluble polymer with the LCST between 36.5~38.5° C. The molar ratio of (a):(b):(c) is about 1~3:1:1~2.

A free radical polymerization is suitably carried out with the above monomers and a free radical generating initiator. The reaction temperature range is from 30° C. to about 150° C. and the preferred temperature is about 45~80° C. The initiator is preferable peroxides, azo catalysts, photochemical or multifunctional catalysts. Typical useful peroxy compounds for initiators include: isopropyl percarbonate, benzoyl peroxide, lauroyl peroxide, and acetyl peroxide. Typical useful azo compounds for initiators include: 2,2'-azo-bis-isobutyronitrile (AIBN), 1,1'-azo-bis(cyclohexanecarbonitrile), and 2,2'-azo-bis(2,4-dimethylvaleronitrile).

The amount of the initiator can vary from 0.002% to 1% by weight of the monomers, but is preferable from 0.03% to 03.% by weight thereof.

The molecular weight can be modified by adding a chain transfer agent in the copolymerization. The amount of the chain transfer agent varies from 1% to about 10% by weight of the monomers. The molecular weight of the polymer decreases with the increase in the chain transfer agent and the molecular weight of the polymer according to the invention is preferably from 1000 to 25000. Any chain transfer agent commonly used to modify the molecular weight of the polymers can be used, for example branched or linear alkyl thiols with 2–21 C atoms, mercapto acids or fluorinated thiols.

The polymer according to present invention can be synthesized in bulk polymerization or in solution polymerization using conventional techniques. The monomers may be dissolved in suitable solvents and such solvents may be present in amounts up to 90%. The suitable solvents in conventional solution polymerization can be ketones, esters, ethers, alcohols, amides etc., such as acetone, methyl ethyl ketone, isopropyl acetate, N,N-dimethylformamide (DMF), ether, ethanol, and butanol. The polymers can also be synthesized by suspension polymerization in aqueous brine in form of round beads, using inorganic salts or water soluble organic polymers as stabilizers.

EXAMPLE 1

5 g (a) N-isopropyl acrylamide (NIP) monomer is dissolved in 35g DMF with slow stirring. 5 g 1-vinyl-2-pyrrolidinone (VPD) monomer and 0.11g 3-mercaptopropionic acid (MPA) as the chain transfer agent are added into the mixture. The monomer mixture is heated to 70° C. and then 0.04 g initiator, 2,2-azo-bis-isobutyronitrile (AIBN), is added to react for 5 hours. After reaction, the mixture is concentrated and then slowly dripped into ether. The resulting light yellow powder is obtained by filtration.

The LCST and the molecular weight of the copolymer are measured by means of Differential Scanning Colorimeter (DSC) and Gel Partition Chromatography (GPC) respectively. The resulting copolymer (the molar ratio of NIP:VPD=1:1) is dissolved in deionized water with solid content 20% and DSC is operated at a heating rate of 2° C./min in nitrogen atmosphere.

The procedure described above is used to obtain the other two copolymers with the molar ratio of NIP:VPD as 2:1 and 10:1, respectively. The LCST and molecular weight of the two polymers are measured in same procedures, and the results are as shown in Table 1. It is found that the LCST of the polymers is elevated from 37.4° C. to 54.8° C. corresponding to the increasing of VPD.

TABLE 1

| NIP:VPD | 1:1 | 2:1 | 10:1 |
|---|---|---|---|
| LCST (° C.) | 54.8 | 39.4 | 37.4 |
| Molecular weight | 12000 | 20000 | 18000 |

EXAMPLE 2

5 g N-isopropyl acrylamide (NIP) monomer is dissolved in 50g DMF with slow stirring. 5 g 1-vinyl-2-pyrrolidinone (VPD) monomer, 3.185g acrylic acid (AA) monomer and 0.15g 3-mercaptopropionic acid (MPA) as the chain transfer agent are added into the mixture. The monomer mixture is heated to 70° C. and then 0.06 g initiator, 2,2-azo-bis-isobutyronitrile (AIBN), is added to react for 5 hours. After reaction, the mixture is concentrated and then dropped into ether. The resulting light yellow powder is obtained by filtration.

The LCST and molecular weight of the copolymer are measured by means of Differential Scanning Colorimeter (DSC) and Gel Partition Chromatography (GPC), respectively. The resulting copolymer (the molar ratio of NIP:VPD:AA=1:1:1) is dissolved in deionized water with solid content 20% and DSC is operated at a heating rate of 2° C./min in nitrogen atmosphere.

The procedure described above is used to obtain the other two copolymers with the molar ratio of NIP:VPD:AA are 2:1:2 and 2:1:4 respectively. The LCST and molecular weight of the other two polymers are measured in same procedures, and the results are as shown in Table 2. It is found that the LCST of the polymers is decreased from 39.7° C. to 26.1° C. corresponding to the increasing of AA.

TABLE 2

| NIP:VPD:AA | 1:1:1 | 2:1:2 | 2:1:4 |
|---|---|---|---|
| LCST (° C.) | 39.7 | 38.4 | 26.1 |
| Molecular weight | 10000 | 18000 | 13000 |

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A thermal responsive, water soluble polymer which comprises the copolymerization product of:

5~95 wt % of N-isopropyl acrylamide (NIP);

0.1~80 wt % of 1-vinyl-2-pyrrolidinone (VPD); and optionally 0.1~30 wt % of acrylic acid (AA).

2. The polymer as claimed in claim 1, wherein the cloud point is 20° C. to 80° C.

3. The polymer as claimed in claim 1, wherein the copolymerization is conducted in the presence of 1wt % to 10 wt %, based on the total amount of the monomers polymerized, of a chain transfer agent.

4. The polymer as claimed in claim 3, wherein the chain transfer agent is 3-mercaptopropionic acid (MPA).

5. A thermal responsive, water soluble polymer with a cloud point between 36.5° C. to 38.5° C., which comprises the copolymerization product of:

(a) N-isopropyl acrylamide (NIP); and (b) 1-vinyl-2-pyrrolidinone (VPD);

wherein the molar ratio between (a) and (b) is 8 to 10:1.

6. The polymer as claimed in claim 5, wherein the copolymerization is conducted in the presence of 1 wt % to 10 wt %, based on the total amount of the monomers polymerized, of a chain transfer agent.

7. The polymer as claimed in claim 6, wherein the chain transfer agent is 3-mercaptopropionic acid (MPA).

8. A thermal responsive, water soluble polymer with a cloud point between 36.5° C. to 38.5° C., which comprises the copolymerization product of:

(a) N-isopropyl acrylamide (NIP);

(b) 1-vinyl-2-pyrrolidinone (VPD); and (c) acrylic acid (AA)

wherein the molar ratio of (a):(b):(c)is 1~3:1:1~2.

9. The polymer as claimed in claim 8, wherein the copolymerization is conducted in the presence of 1 wt % to 10 wt %, based on the total amount of the monomers polymerized, of a chain transfer agent.

10. The polymer as claimed in claim 9, wherein the chain transfer agent is 3-mercaptopropionic acid (MPA).

11. A thermal responsive, water soluble polymer represented by the following formula:

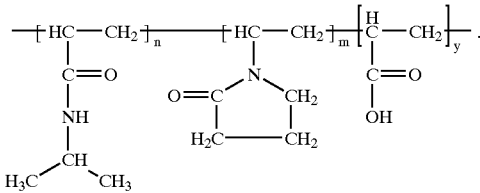

12. The polymer as claimed in claim 11, wherein the cloud point of the polymer is 20° C. to 80° C.

* * * * *